United States Patent [19]
Meyers et al.

[11] 3,876,689
[45] Apr. 8, 1975

[54] ONE-STEP SYNTHESIS OF ALPHA, BETA-UNSATURATED SULFONATE SALTS BY THE REACTION OF CARBON TETRAHALIDES WITH CERTAIN SULFONES

[75] Inventors: Cal Y. Meyers; Laurence L. Ho, both of Carbondale, Ill.

[73] Assignee: Southern Illinois University Foundation, Carbondale, Ill.

[22] Filed: Aug. 28, 1972

[21] Appl. No.: 284,046

[52] U.S. Cl.......... 260/503; 260/513 R; 260/543 R; 260/609 A; 260/609 F; 260/607 A; 260/505 R
[51] Int. Cl............................................ C07c 143/00
[58] Field of Search........ 260/513 R, 513 B, 513 H, 260/503, 505 R

[56] References Cited
UNITED STATES PATENTS
3,255,240  6/1966  Wolfram et al................. 260/513 R OTHER PUBLICATIONS
Meyers et al., J. Amer. Chem. Soc., 91, 7510 (1969).
Neureiter, ibid., 88, 558 (1966).

Primary Examiner—Leon Zitver
Assistant Examiner—Nicky Chan
Attorney, Agent, or Firm—Koenig, Senniger, Powers and Leavitt

[57] ABSTRACT $\alpha,\beta$-Unsaturated sulfonic acid salts are prepared by a one step synthesis involving reaction of a di-primary alkyl sulfone, an arylmethyl primary alkyl sulfone, an $\alpha$-halo di-primary alkyl sulfone, or an $\alpha$-haloarylmethyl primary alkyl sulfone with a carbon tetrahalide and a strong base. The sulfone substrate is reacted with a carbon tetrahalide represented by the formula $CBr_mCl_nF_p$ where m and n are integers between 0 and 4 inclusive, p is an integer between 0 and 2 inclusive and m+n+p = 4 in the presence of the strong base to form a geminally $\alpha$-dihalogenated intermediate and dihalocarbene. The geminally $\beta$-dihalogenated intermediate reacts rapidly in situ with the strong base to form an $\alpha,\beta$-unsaturated sulfonic acid salt and a halide salt. The unsaturated sulfonic acid salt may be acidified to form the corresponding acid or reacted with a halogenating agent to form the corresponding acid halide. $\alpha,\beta$-Unsaturated sulfonic acid salts are useful detergents.

8 Claims, No Drawings 3,876,689

ONE-STEP SYNTHESIS OF ALPHA, BETA-UNSATURATED SULFONATE SALTS BY THE REACTION OF CARBON TETRAHALIDES WITH CERTAIN SULFONES

BACKGROUND OF THE INVENTION

This invention relates to the field of organic chemistry and more particularly to the base-catalyzed reactions of certain carbon tetrahalides with various primary alkyl sulfones.

Until recently, carbon tetrachloride was generally considered to be a compound of limited chemical reactivity and has generally found application in services which capitalize on its relative chemical inertness. Thus, for example, carbon tetrachloride is useful as a fire extinguishing agent, as a cleaning solvent and as a solvent for organic chemical reactions. For many years carbon tetrachloride found its principal application as a solvent, particularly for cleaning purposes. Recently this market has been substantially closed off, however, due to government restrictions relating to the toxicity of carbon tetrachloride.

Commercially, the use of carbon tetrachloride as a chemical intermediate has heretofore been restricted to a few specialized reactions. Thus commercial production of chloroform, for example, is carried out by reduction or carbon tetrachloride with iron and water. Compounds marketed under the trade designation "Freons" such as dichlorodifluoromethane and trichloromonofluormethane are produced commercially by partially displacing chlorine from carbon tetrachloride with fluorine. The production of such "Freon" compounds has represented the principal commercial outlet for carbon tetrachloride for several years, and in recent years has provided the only major market for this material.

In the copending and coassigned applications of Cal Y. Meyers and Walter S. Matthews, III, Ser. No. 98,078, filed Dec. 14, 1970, Cal Y. Meyers, Walter S. Matthews, III, and Ashok M. Malte, Ser. No. 98,094, filed Dec. 14, 1970, now U.S. Pat. No. 3,830,862, and Cal Y. Meyers and Ashok M. Malte, Ser. No. 98,079, filed Dec. 14, 1970, novel reactions of carbon tetrahalides with ketones, primary alcohols, secondary alcohols, camphor, aryl alkyl sulfones, dibenzyl sulfones and secondary alkyl sulfones are disclosed. As taught by Meyers, Matthews, and Malte in Ser. No. 98,094, dibenzyl sulfones having $\alpha$ and $\alpha'$ hydrogens and disecondary alkyl sulfones having $\alpha$ and $\alpha'$ hydrogens are converted to alkenes, and aryl alkyl sulfones are converted to aryl haloalkyl sulfones. Aryl methyl sulfones are $\alpha$-trihalogenated and may subsequently be hydrolyzed to produce aryl sulfonic acids.

Because of its abundance and relatively low cost, carbon tetrachloride is potentially a very attractive chemical intermediate. Prior to the present invention, however, the known utility of carbon tetrachloride as a chemical intermediate was limited to certain specific reactions such as those set forth above. It was not known what products, if any, could be obtained by reaction of carbon tetrahalides with other organic substrates. In particular it was not known what products, if any, could be obtained by reaction of carbon tetrahalide with primary alkyl sulfones and with benzyl primary alkyl sulfones.

$\alpha$-Olefinic sulfonic acid salts are known to be useful detergents. Because they are gradually degraded under ambient conditions, they are potentially attractive nonpolluting detergents. However, commercially practicable methods for economically preparing such sulfonic acids (and salts) of good detergent properties have not generally been available. Among the previously known schemes for producing $\alpha$-olefinic sulfonic acids are dehydrochlorination of $\beta$-chloroalkanesulfonic acids and direct sulfonation of olefins with sulfur trioxide. The dehydrochlorination route has not been commercially attractive because of the difficulty and expense involved in producing the $\beta$-chlorinated alkanesulfonic acid intermediates. The direct sulfonation method has also been unattractive since it leads to the production of undesired byproducts, and special processing, such as the high temperature and high pressure hydrolysis scheme disclosed in British Pat. No. 1,124,706, is often required to produce a satisfactory product. A need has existed in the art for an improved method for preparing $\alpha$-olefinic sulfonic acids of high detergency.

SUMMARY OF THE INVENTION

It is an object of the present invention, therefore, to provide a method for producing useful compounds by reaction of certain primary alkyl sulfones with carbon tetrahalides such as carbon tetrachloride and carbon tetrabromide. It is a further object of the present invention to provide such a method whereby certain novel organic compounds can be produced and certain known organic compounds can be produced in a more convenient and economical manner than has previously been practical. A particular object of the invention is to provide an improved method for producing degradable $\alpha,\beta$-unsaturated sulfonic acid salts having detergent properties. Other objects and features will be in part apparent and in part pointed out hereinafter.

Broadly, therefore, the present invention is directed to a process for preparing $\alpha,\beta$-unsaturated sulfonic acid derivatives. The process comprises the steps of reacting a di-primary alkyl sulfone, an arylmethyl primary alkyl sulfone, an $\alpha$-halo di-primary alkyl sulfone, or an $\alpha$-haloarylmethyl primary alkyl sulfone with a carbon tetrahalide represented by the formula $CBr_mCl_nF_p$ where m and n are integers between 0 and 4 inclusive, p is an integer between 0 and 2 inclusive, and m+n+p = 4, in the presence of a strong base to form a geminally $\alpha$-dihalogenated intermediate and dihalocarbene; and reacting the di-$\alpha$-halogenated intermediate with a strong base to form a salt of an $\alpha$-olefinic sulfonic acid and a halide salt. The invention is also directed to novel $\alpha,\beta$-unsaturated sulfonic acids and salts having the general formula:

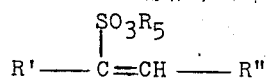

where R' is alkyl and R" is alkyl or aryl. The invention is further directed to the corresponding sulfonyl halides having the general formula:

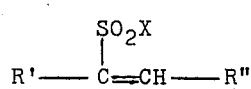

where X is halogen and R' and R" are as defined above.

DESCRIPTION OF THE PREFERRED EMBODIMENTS

It has now been discovered that di-primary alkyl sulfones, like di-secondary alkyl sulfones, can be reacted with carbon tetrahalides in the presence of a base. Unlike the di-secondary alkyl sulfones, which are converted to alkenes with expulsion of the sulfonyl moiety, the di-primary alkyl sulfones retain the sulfonyl moiety and are converted to $\alpha,\beta$-unsaturated sulfonic acid derivatives. The reaction scheme of the present invention represents a highly advantageous route to the preparation of the $\alpha,\beta$-unsaturated sulfonic acid salts which, as indicated above, are attractive degradable detergents. The reactions of this invention proceed rapidly, in high yield, at moderate temperatures, for example, ambient temperatures or less up to about 250°C.

Other substrates which undergo the reactions of the invention include arylmethyl primary alkyl sulfones, $\alpha$-halodiprimary alkyl sulfones, and $\alpha$-haloarylmethyl primary alkyl sulfones. As used herein, the term "primary alkyl" does not include methyl but does include ethyl and other $C_nH_{2n+1}$ groups having more than one carbon atom. The unmodified term "alkyl," on the other hand, should be understood in its conventional sense, i.e., as including methyl as well as higher alkyl groups.

The principal products of the reactions of this invention are salts of $\alpha,\beta$-unsaturated sulfonic acids. As noted above, the alkali metal salts of these acids are known to be useful as detergents. Because they are degradable, they are essentially nonpolluting and thus represent particularly attractive alternatives to other detergents now in use.

As in the case of di-secondary alkyl sulfones, the reactions of the present invention are thought to be initiated by the base-catalyzed reaction of a carbon tetrahalide with the sulfone substrate (NuH) in accordance with the following equations (where $CCl_4$ is shown as an illustrative carbon tetrahalide and R is hydrogen or an alkyl group):

1. $NuH \underset{\rightleftarrows}{\overset{OR^-}{}} Nu:^- + ROH$

2. $Nu:^- + ClCCl_3 \rightarrow NuCl + :CCl_3^- \rightleftarrows :CCl_2 + Cl^-$

3. $NuCl \overset{OR^-}{\rightarrow}$ products

In reaction (1) the substrate material NuH associates with the strong base, yielding a nucleophilic carbanion $Nu:^-$. The anion, in turn, either directly or indirectly reacts with one of the halogen atoms of the carbon tetrahalide [equation (2)], yielding a monohalogenated intermediate and a trihalomethyl anion which dissociates into a dihalocarbene and a halide ion.

In the case of di-secondary alkyl sulfones and dibenzyl sulfone the monohalogenated species then undergoes the Ramberg-Backland reaction, and is coverted in situ to the corresponding alkene or stilbene with explusion of the sulfonyl moiety. In contrast to the course taken by dibenzyl sulfones and di-sec-alkyl sulfones, it has now been discovered that the monohalogenated intermediates produced during the reaction of carbon tetrahalides with di-primary alkyl sulfones and arylmethyl primary alkyl sulfones are not usually converted directly to alkenes, but rather to the geminally dihalogenated intermediates which, ultimately, yield the $\alpha,\beta$-unsaturated sulfonic acid derivatives.

While we do not wish to be held to any particular theory, we postulate that the difference in the nature of the products obtained from dibenzyl sulfones and di-primary alkyl sulfones, respectively, each of which have two $\alpha$hydrogens and two $\beta'$hydrogens, results from differences in the relative rates with which the monohalo derivatives undergo halogenation and episulfone formation. These differences and their effects on the products obtained are illustrated by the following equations. In the case of dibenzyl sulfone, carbon tetrachloride, and base, the reaction is thought to proceed in the following fashion:

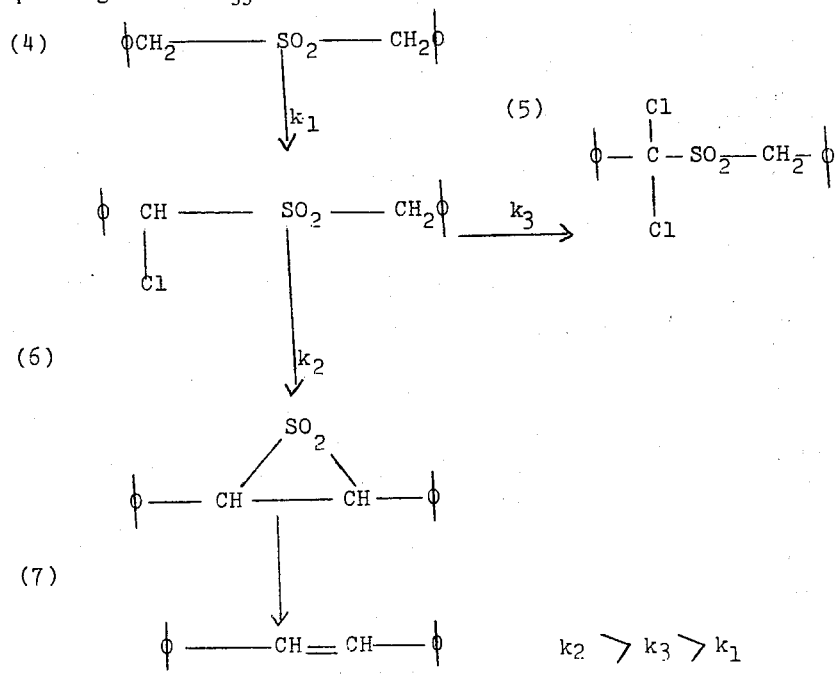

Thus, the monohalogenated intermediate is used up as fast as it is formed, and since the kinetics of episulfone formation ($k_2$) are more favorable than the kinetics of dihalogenation ($k_3$), the monohalogenated species directly undergoes the Ramberg-Backland reaction to form the alkene.

In the case of di-primary alkyl sulfone, however, the relationship of the reaction rate constants is believed to be reversed (with $CCl_4$ as the halogenating agent and $R_1$ and $R_2$ designating alkyl groups):

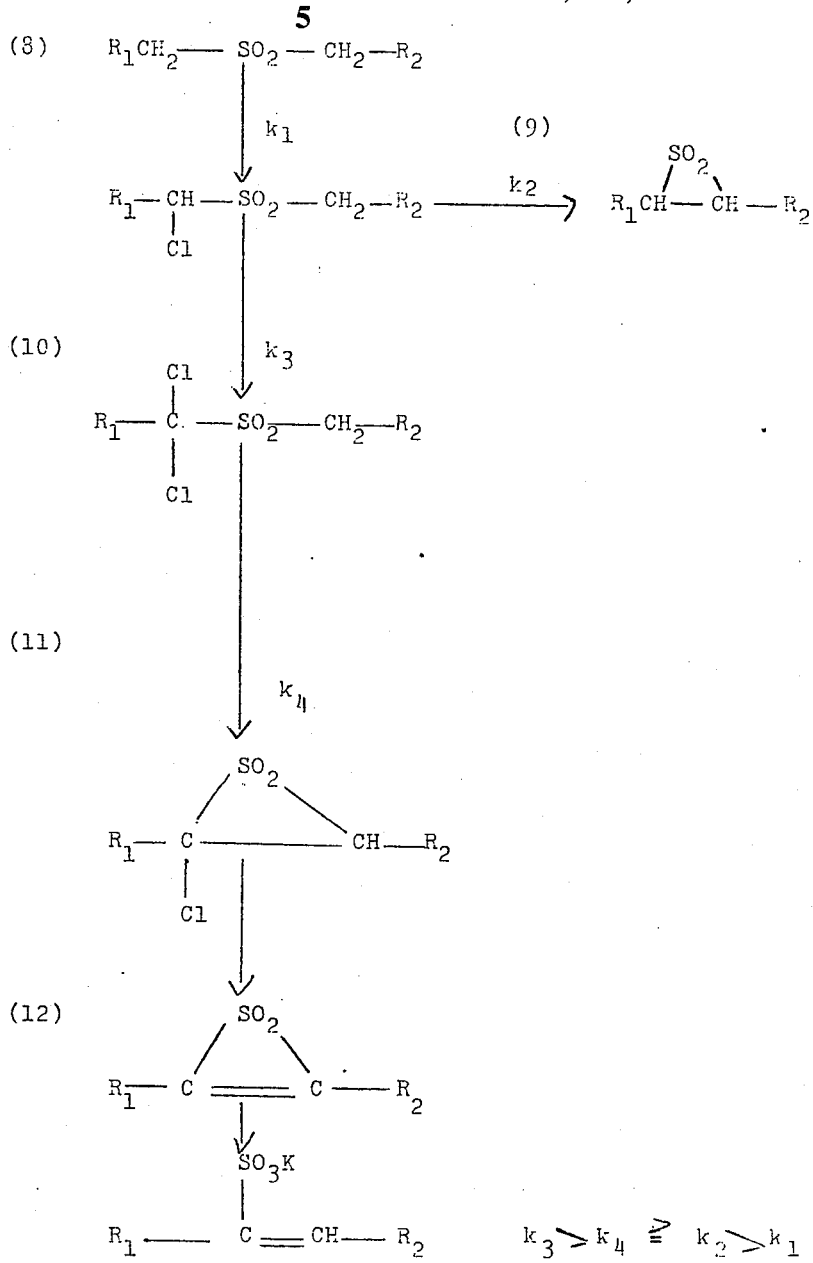

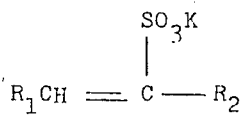

In accordance with this postulated mechanism, the monohalogenated di-primary alkyl sulfones are converted ($k_3$) to the geminally $\alpha$-dihalogenated species faster than they are formed ($k_1$), at a rate which exceeds the rate of simple episulfone formation ($k_2$). The dihalogenated intermediates are then converted to the chloro-episulfones in accordance with the Ramberg-Backland rearrangement. The chloro-episulfones undergo dehydrohalogenation faster than SO₂ extrusion under these conditions, and the resulting unsaturated episulfones (thiirene 1, 1-dioxides) are then cleaved by base to form $\alpha,\beta$-unsaturated sulfonic acid salts.

In the conversion of di-secondary alkyl sulfones to alkenes, the route taken by the reactions of the present invention is not available. The absence of geminal $\alpha$-protons from secondary alkyl sulfones precludes the possibility of the geminal dihalogenation which is experienced by primary alkyl sulfones. In the case of dibenzyl sulfone (which does have geminal $\alpha$hydrogens), the great acidity of the $\alpha'$hydrogens in the monohalo derivative permits simple episulfone formation to occur before geminal $\alpha$dichlorination is accomplished, resulting in the formation of a simple alkene.

Alkenes produced from di-secondary alkyl sulfones in these reactions are highly subject to reaction with the dihalocarbene coproduced to form substituted 1,1-dihalocyclopropanes. This type of addition reaction does not occur with the α,β-unsaturated sulfonic acid salts produced in accordance with the present invention. The sulfonate groups of the α,β-unsaturated sulfonic acids apparently function in a manner similar to the phenyl groups of stilbene, withdrawing sufficient electron density from the olefinic linkage so that the rate of dihalocarbene addition is reduced, and the dihalocarbene reacts exclusively with solvent and base.

The reactions of the invention are accelerated if a solvent for the substrate and the carbon tetrahalide is incorporated in the reaction system. A wide range of solvents, particularly polar solvents, may be utilized for this purpose. Thus, for example, an alcohol, polyol, cyclic ether, aliphatic ether, cyclic polyether, aliphatic polyether, tetrahydrofuran, glyme, di-glyme, liquid ammonia or liquid sulfur dioxide serves as a suitable solvent. Tertiary alcohols, however, are preferred. t-Butyl alcohol has been found to be a particularly useful polar solvent since it does not react with the substrate, or to any harmful extent with the tetrahalomethane, and has sufficient volatility to be readily evaporated during product recovery.

The preferred carbon tetrahalide reactant is carbon tetrachloride. However, CBr$_4$ will also perform satisfactorily in these reactions, as will CBrCl$_3$, CBr$_2$Cl$_2$, CBr$_3$Cl, CCl$_3$F, CCl$_2$BrF, CClBr$_2$F, CBr$_3$F, CCl$_2$F$_2$CClBrF$_2$, and CBr$_2$F$_2$. Generally, therefore, any compounds having the formula CBr$_m$Cl$_n$F$_p$, where m and n are integers between 0 and 4 inclusive, p is an integer between 0 and 2 inclusive, and m+n+p = 4, can be utilized as the tetrahalide reactant in this invention.

The strong base used in this invention is preferably an alkaline hydroxide, e.g., NaOH or KOH, or a metal alkoxide such as a sodium, potassium or aluminum alkoxide. Solid potassium hydroxide is preferred, especially in the powdered, commercially dry form.

In accordance with the reactions of the present invention, diprimary alkyl sulfones corresponding to the structural formula:

$$R_1\text{-CH}_2\text{-SO}_2\text{-CH}_2\text{-R}_2$$

wherein R$_1$ and R$_2$ are both alkyl, are converted to mixtures of α,β-unsaturated sulfonic acid salts having the formulae:

and

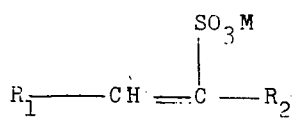

where M is an alkali metal and R$_1$ and R$_2$ are as defined above. For detergent use, the α,β-unsaturated sulfonic acid salts, and thus the substrates from which they are derived, may typically contain a total of between about 10 and about 20 carbon atoms, for example, 14–16 carbon atoms.

Arylmethyl primary alkyl sulfones having the structural formula $$R_3\text{-CH}_2\text{-SO}_2\text{-CH}_2\text{-R}_4$$

where R$_3$ is aryl and R$_4$ is alkyl are converted by the reactions of the invention to aryl-substituted α,β-unsaturated sulfonic acid salts having the structural formula

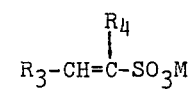

where R$_3$, R$_4$ and M are as defined above. A certain proportion of alkenes is also formed by the reaction. The pathway of this reaction differs from that set forth above for di-primary alkyl sulfones. The aryl-substituted thiirene 1,1-dioxide undergoes cleavage to yield only the α,β-unsaturated sulfonic acid in which the sulfonic acid group is on the carbon containing the alkyl group (R$_4$). With CCl$_4$, for example:

$$R_3\text{-CH}_2\text{-SO}_2\text{-CH}_2\text{-R}_4 \rightarrow R_3\text{-CHCl-SO}_2\text{-CH}_2\text{-R}_4 \rightarrow R_3\text{-CCl}_2\text{-SO}_2\text{-CH}_2\text{-R}_4$$

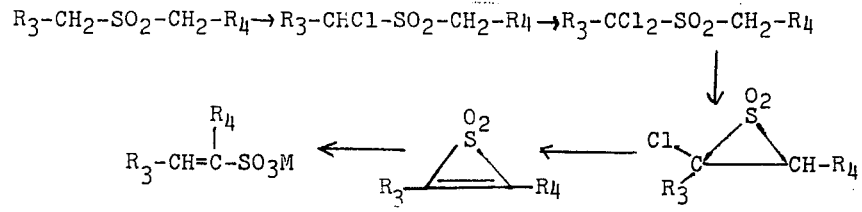

where R$_3$, R$_4$ and M are as defined above. This result differs from the result obtained with di-primary alkyl sulfone substrates, as described above, where a mixture of the two possible α-olefinic sulfonic acid isomers is produced.

One of the essential advantages of the reactions of the present invention arises from the relative ease with which a di-primary alkyl sulfone, or arylmethyl primary alkyl sulfone, may be β-halogenated and then converted in situ to the α,β-unsaturated sulfonic acid salt. As those skilled in the art will appreciate, however, an α-halogenated di-primary alkyl sulfone corresponding to the structural formula:

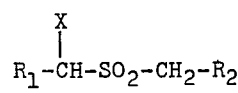

where X is halogen and R$_1$ and R$_2$ are as defined above, or an α-haloarylmethyl sulfone corresponding to the structural formula:

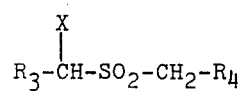

wherein R$_3$, R$_4$, and X are as defined above, may serve as the initial substrate. The α,β-unsaturated sulfonic acid salts obtained from such α-halo sulfones are identical to those obtained from the corresponding non-halogenated sulfones.

Although the use of an α-halo substrate is less preferred in most instances, since it necessitates separate preparation of the α-halo sulfone, it does afford exceptionally high reaction rates and further facilitates the realization of higher yields since side reactions that may compete with the relatively slow monohalogenation, especially of dialkyl sulfones ($R_1$ and $R_2$ are alkyl), are avoided.

Normally, the halide ion produced in equation (II), supra, interacts with the cation of the strong base to form a salt which is insoluble in the reaction medium. If the strong base remains a solid during the reaction, this salt often tends to collect on the surface of the base, and thereby impedes the formation of the substrate carbanion per equation (I) and the formation of products per equation (III). The rates and yields of the reactions of the invention, particularly those where the rate of the carbanion formation may be relatively slow, can be adversely affected by this phenomenon. It is preferred, therefore, that a small quantity of water be present in the reaction medium, especially in those reactions where carbanion formation is slow. In such instances, the presence of a very small amount of water dissolves the halide salt as it is formed and collects on the surface of the solid base; solution of the salt prevents its interference with the formation of the carbanions in the initial and subsequent reactions.

The amount of water normally present in commercial-grade potassium hydroxide, i.e., about 15 percent, is sufficient to allow the continuation of the reactions of the invention. An additional amount of water is preferred, however. Where a solvent is present the amount of water used is preferably the maximum consistent with the maintenance of a single liquid phase. If too much water is present, a separate aqueous phase may begin to form. Separation of aqueous and organic phases adversely affects reaction kinetics. Where no solvent is present, it is preferable to maintain relative proportions of water and base such that a substantial proportion of the base remains in the solid phase during the reaction. The reactions of the invention proceed most satisfactorily at a liquid/solid interface.

The reactions of this invention proceed rapidly in high yield at moderate temperatures. Temperatures from just above the solidification point of the reaction system (about −15°C.) up to a temperature of about 250°C. may be employed. Higher temperatures can be tolerated but are normally unnecessary. Conveniently the reactions are simply carried out at room temperature or slightly higher. To facilitate particularly rapid reactions and high conversion, the reaction system is maintained above atmospheric reflux temperature. Atmospheric reflux occurs at about 80°C. where a reaction system comprising carbon tetrachloride and t-butyl alcohol is employed and, in this instance, a particularly suitable temperature may be on the order of 150°C.

The relative proportions of reactants are not critical, and may be varied widely. A substantial excess of carbon tetrahalide, base and polar solvent promotes rapid reaction and high conversions. Lower excesses, however, provide larger reactor payloads and, as will be appreciated by those skilled in the art, the optimum commercial reactant ratios depend on the substrates and products involved, the capacities desired, the separation processes selected, and whether batch or continuous operations are employed.

In the recovery of the α,β-unsaturated sulfonic acid salts from the reaction mixture, it is preferable to first evaporate the solvents, and triturate the resulting residue with a solvent such as hot t-butyl alcohol. The α,β-unsaturated sulfonic acid salts and any unreacted sulfones are taken up by the solvent, and a residue constituted by solid base and by-product inorganic salts is separated by filtration. Alternatively, continuous extraction (i.e., Soxhlet) may be used. The liquid phase is then evaporated, leaving a residue comprising a mixture of unreacted sulfone and sulfonic acid salt. The appropriate method for separation of the sulfonic acid salt from the sulfone varies with the number of carbon atoms in the sulfonic acid product. Where the number of carbon atoms of the sulfonic acid salt is relatively low, for example 4–8, the sulfone may simply be extracted with acetone, leaving the sulfonic acid salt as a residue product. Where the product contains a relatively large number of carbon atoms, for example on the order of 16, it is preferable to add water to the sulfone/sulfonic acid salt mixture, extract the sulfone from the resulting aqueous mixture with ether, and concentrate the aqueous layer to dryness, providing the sulfonate salt, again as the residue product.

Alternatively, the reaction mixture can be neutralized, for example with $H_2SO_4$ or $HCl$ or $H_3PO_4$ to pH 7, and the solvent then evaporated leaving a residue comprising salts and unchanged sulfone. Since no base is then present, ethanol can be used to extract the sulfone/sulfonic acid salt. Continuous extraction with dry ethanol (i.e., Soxhlet) is preferred. Concentration of the ethanolic extract leaves solid sulfone/sulfonic acid salt, from which the sulfone can be removed by the techniques already described.

As noted, the various alkali metal α,β-unsaturated sulfonic acid salts produced by the reaction scheme of the present invention are novel compounds useful, for example, as the major surface active constituent of detergents. If desired, the salts may be acidified to produce the sulfonic acids themselves, which are also novel, and which in turn may be condensed with various bases to form other salts. The novel acids and salts produced by the reactions of the invention thus include

(I)

and

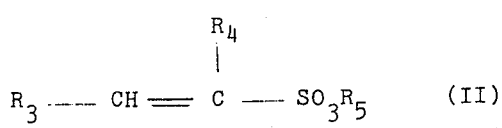

(II)

where $R_1$ and $R_2$ are the same or different alkyl groups, $R_3$ is aryl, $R_4$ is alkyl and $R_5$ is hydrogen or alkali metal. It has generally been found that $R_1$ and $R_2$ of formula I from this invention are cis, a geometric configuration believed to be especially suitable for detergent use. Likewise, from this invention, $R_3$ and $R_4$ of formula II, are cis with respect to other.

Each of the α,β-unsaturated sulfonic acid salts produced in the reactions of the invention may be converted to certain novel sulfonyl halides. Sulfonyl halides having the general formulae:

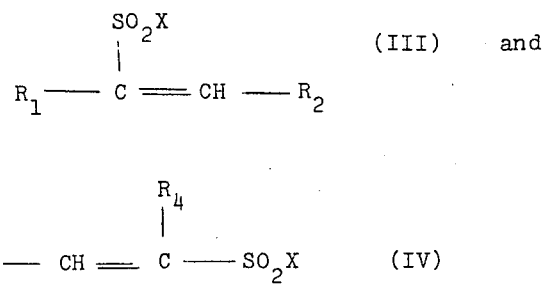

wherein X is halogen, $R_1$ and $R_2$ are alkyl, $R_3$ is aryl, and $R_4$ is alkyl may be formed by the action of a halogenating agent such as $PCl_5$ or $POCl_3$ on the α, β-unsaturated sulfonic acid salt.

Generically, the compositions of the invention are represented by the structural formulae:

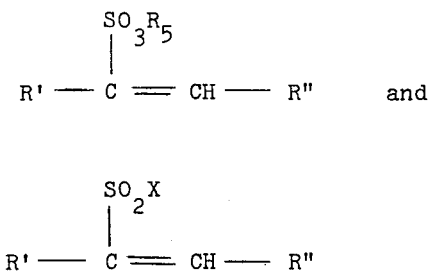

where $R_5$ and X are as defined above, R' is alkyl and R'' is alkyl or aryl.

In the preparation of the sulfonyl chloride, the powdered salt of the acid is suspended in chloroform and the resulting slurry stirred vigorously while $PCl_5$, $POCl_3$ or $SOCl_2$ is added. The chlorinating agent dissolves in the chloroform and reacts with the sulfonic acid salt to produce the sulfonyl chloride and an inorganic chloride salt precipitate, e.g., KCl. The reaction temperature is preferably in the range of about 25°–40°C. After reaction is complete, the solid chloride salt is separated, as by filtration, and the clarified solution is washed with water or a dilute carbonate or bicarbonate solution and dried. The chloroform solvent is then stripped off to obtain the sulfonyl chloride. Other sulfonyl halides may be produced in a similar fashion using other halogenating agents.

The sulfonyl halides of this invention are effective sulfonylating agents. Aryl compounds, for example, may be sulfonylated to the corresponding aryl α-alkenyl sulfones in accordance with the Friedel-Crafts reaction, using these sulfonyl halides and anhydrous $AlCl_3$ as a catalyst.

Phenols react readily with the sulfonyl chlorides, even in the absence of catalyst, to produce to corresponding o- and p-hydroxyphenyl sulfones. The α,β-unsaturated sulfones formed from these reactions are themsleves reactive intermediates, and undergo Michael additions with water, alcohols, amines, sulfinates and sulfites, carbanions, etc.

Sulfonyl halides are reduced to sulfinic acids by treatment with solidum bisulfite or zinc dust. Thus, α-olefinic sulfinic acids may be obtained from these α-olefinic sulfonyl halides; α-olefinic sulfinic acids are rare organic species, difficult to prepare by other schemes. Further reduction produces the α-olefinic thiol, in which $R_1$ and $R_2$ are cis. Tautomerism to the thioketones would also occur to some extent. The addition of $H_2S$ to alkynes of the type $R_a$-C C-$R_b$ (where $R_a$ and $R_b$ are alkyl) is the only common method of producing α-olefinic thiols, and mixtures of thiols in which $R_a$ and $R_b$ are cis and trans are generally formed, in poor yields since the α-olefinic thiol itself undergoes further reaction.

The following examples illustrate the invention.

EXAMPLE 1

A mixture containing 2.0 g. of diethyl sulfone, 20 ml. of carbon tetrachloride, 20 ml. of tertiary butyl alcohol, and 8.0 g. of powdered potassium hydroxide was heated on the steam bath at a temperature of 80°C. with vigorous stirring for 2 hours. The reaction mixture was then filtered to remove the solids (mainly KCl and KOH), the solids were washed with hot t-butyl alcohol (designated in these examples as BuOH) and the filtrate and washings were concentrated by evaporation leaving a solid mass. The remaining mass, after being triturated several times with ether, was dried in a vacuum oven to provide 1.25 g. of potassium 2-butene-2-sulfonate, characterized by its infrared spectrum (in mineral oil - Nujol) and nmr (in $D_3O$). Some unchanged sulfone was recovered by evaporating the ether washings.

When the reaction of sulfone, potassium hydroxide and carbon tetrachloride in t-butyl alcohol was allowed to continue for 10 to 12 hours at 80°C., yields of potassium 2-butene-2-sulfonate greater than 70 percent were obtained, and no unreacted sulfone was isolated.

To a saturated aqueous solution of a molar equivalent amount of p-toluidine hydrochloride the potassium 2-butene-2-sulfonate was added, and the solution stirred for several minutes. Acetone was then added and precipitated potassium chloride was removed by filtration. The filtrate was evaporated to dryness and the residue triturated with boiling n-heptane and decanted, the procedure being repeated four times. The combined n-heptane decantates were evaporated to dryness and the solid residue recrystallized from n-heptane-ethanol. The resulting flocculent white crystals melted at 133–134°C. (corr.). The crystalline material was identified as the p-toluidine salt of 2-butene-2-sulfonic acid by infrared (in Nujol and nmr (DMSO$_{d6}$) analysis, as well as elemental analysis: Calculated for $C_{11}H_{17}NO_3S$: C, 54.30; H, 7.04; S, 13.18. Found: C, 52.65; H, 6.49; S, 12.88.

EXAMPLE 2

A mixture containing 3.0 g. of n-propyl sulfone, 30 ml. of carbon tetrachloride, 30 ml. of tertiary butyl alcohol, and 12.0 g. of powdered potassium hydroxide was heated on the steam bath at a temperature of 80°C. with vigorous stirring for 2 hours. The reaction mixture was then filtered to remove the solids (mainly KCl and KOH), the solids were washed with hot t-BuOH, and the filtrate and washings were concentrated by evaporation. The resulting solid mass was triturated several times with ether, and dried in the vacuum oven, leaving 2.20 g. of solid material identified by its infrared (in Nujol) and nmr spectra (in $D_2O$) as potassium 3-hexene-3-sulfonate. A small amount of unreacted sulfone (0.77 g.) was recovered from the trituration washings.

When the reaction of sulfone, carbon tetrachloride, and potassium hydroxide in t-butyl alcohol was allowed to reflux (82°C.) for ten to twelve hours, the yield of potassium 3-hexene-3-sulfonate was greater than 70 percent, and no unreacted sulfone was isolated.

A saturated aqueous solution of potassium 3-hexene-3-sulfonate was acidified with hydrochloric acid to pH 3 and maintained at this pH while a molar excess of p-toluidene was added. The solution was then evaporated to dryness and the resulting residue was triturated several times with ethanol. The ethanolic solutions were separated from the insoluble solids, combined, and evaporated to dryness. The resulting solid residue was continuously extracted (Soxhlet) for twelve hours with n-heptane, and the extracts were then concentrated to dryness, leaving white crystals which were recrystallized from n-heptane-ethanol; m.p. 140°–141°C. (corr.). The white crystals were identified as the p-toluidene salt of 3-hexene-3-sulfonic acid by infrared (Nujol), nmr ($DMSO_{d6}$) and elemental analysis: Calculated for C, 57.41; H, 7.76; S, 11,82. Found: C, 56.51; H, 7.35; S, 10.81.

EXAMPLE 3

A mixture containing 2.5 g. of ethyl n-propyl sulfone (M.P. 23–24°), 25 ml. of carbon tetrachloride, 2.5 ml. of tertiary butyl alcohol and 10 g. of powdered potassium hydroxide was heated on a steam bath at a temperature of 80°C. with vigorous stirring for ten hours. The reaction mixture was then filtered to remove the solids, the solids were washed with hot t-BuOH and the combined filtrate and washings were concentrated in vacuum. The remaining solid mass, after being triturated several times with ether, was dried in a vacuum oven, leaving 2.4 g. (70 percent yield) of a solid identified by infrared (Nujol) and nmr ($D_2O$) spectra as a mixture of the potassium salts of 2-pentene-2-sulfonic acid (~ 55%) and 2-pentene-3-sulfonic acid (~ 45 percent). No unchanged sulfone was recovered from the ether washings.

EXAMPLE 4

α-chloroethyl propyl sulfide was prepared by the reaction of acetaldehyde, propyl mercaptan and dry hydrogen chloride gas in chloroform. The sulfide was isolated and purified by distillation and then was oxidized with perbenzoic acid (in $CHCl_3$) to α-chloroethyl propyl sulfone, bp 60°–65°/0.20 mm.

A mixture containing 1.7 g. of α-chloroethyl propyl sulfone, 15 ml. of carbon tetrachloride, 15 ml. of tertiary butyl alcohol, and 6.0 g. of powdered potassium hydroxide was refluxed (82°C.) on a steam bath with vigorous stirring for two hours. The reaction mixture was then filtered to remove solids (mainly KCl and KOH), the solids washed with hot t-BuOH, and the filtrate and washings were combined and concentrated by evaporating the solvent. The remaining solid mass was triturated several times with ether and dried in a vacuum oven, leaving 1.85 g. (~ 100 percent yield) of a solid identified by infrared (Nujol) and nmr ($D_2O$) spectra as a mixture of about equal amounts of potassium 2-pentene-2-sulfonate and 2-pentene-3-sulfonate, identical to the product from Example 3.

EXAMPLE 5

α-Chloroethyl propyl sulfone was converted to a mixture of about equal amounts of potassium 2-pentene-2-sulfonate and potassium 2-pentene-3-sulfonate in a manner similar to that described in Example 4 except that the reaction mixture was agitated at room temperature for only 5–10 minutes. The results of the reaction of this example illustrate the great acceleration in subsequent reactions with $CCl_4$ and KOH which is realized when an α-chlorine is initially present on the substrate.

EXAMPLE 6

α-Chloropropyl ethyl sulfide was prepared by the reaction of propionaldehyde, ethyl mercaptan and dry hydrogen chloride gas in chloroform. The sulfide was isolated and purified by distillation and then oxidized with perbenzoic acid (in $CHCl_3$) to α-chloropropyl ethyl sulfone, bp 97°–99°/2.0 mm.

A mixture containing 1.7 g. of α-chloropropyl ethyl sulfone, 20 ml. of carbon tetrachloride, 20 ml. of tertiary butyl alcohol, and 8.0 g. of powdered potassium hydroxide was heated on a steam bath at a temperature of 82°C. with vigorous stirring for two hours. The reaction mixture was then filtered to remove solids (mainly KCl and KOH), the solids were washed with hot t-BuOH, and the filtrate and washings were combined and concentrated by evaporating the solvent. The remaining mass was triturated several times with ether and dried in a vacuum oven, leaving 1.83 g. (~ 100 percent yield) of a solid identified by infrared (Nujol) and nmr ($D_2O$) spectra as a mixture of about equal amounts of potassium 2-pentene-2-sulfonate and 2-pentene-3-sulfonate, identical to the product from Examples 3, 4, and 5.

EXAMPLE 7

α-Chloropropyl ethyl sulfone was converted to a mixture of almost equal amounts of potassium 2-pentene-2-sulfonate and 2-pentene-3-sulfonate in a manner similar to that described in Example 6 except that the reaction mixture was vigorously stirred at room temperature for only 5 to 10 minutes. This example further illustrates the rate-enchancing effect of the initial presence of an α-chlorine on the substrate.

EXAMPLE 8

A mixture containing 5.0 g. of di-n-butyl sulfone, 50 ml. of carbon tetrachloride, 50 ml. of tertiary butyl alcohol, and 20 g. of powdered potassium hydroxide was heated on a steam bath at a temperature of 80°C. with vigorous stirring for two hours. The reaction mixture was then filtered to remove solids (mainly KCl and KOH), the solids washed with hot t-BuOH, and the combined washings and filtrate were concentrated to remove the solvent. The remaining mass was triturated several times with ether, leaving 3.65 g. of a solid identified by infrared (nujol) and nmr ($D_2O$) spectra as potassium 4-octene-4-sulfonate (57% yield based on charge). A small amount of unreacted sulfone (0.85 g.) was recovered from the trituration washings.

When the sulfone, carbon tetrachloride and potassium hydroxide were refluxed (80°C.) for 10 to 12 hours, the yield of potassium 4-octene-4-sulfonate were greater than 70%.

A solution of 0.5 g. of potassium 4-octene-4-sulfonate was dissolved in 15 ml. of water, acidified with hydrogen chloride to pH 3 and maintained at this pH while a slight molar excess of p-toluidine was added and the mixture agitated. A white crystalline solid slowly formed, which was removed by filtration, dried in a vacuum oven, and recrystallized from n-hexene-ethanol; m.p. 165°–166°C. (corr.). It was characterized as the p-toluidine salt of 4-octene-4-sulfonic acid by infrared (Nujol) and nmr ($DMSO_{d6}$) spectra, and elemental analysis: Calculated for C, 60.17; H, 8.41; N, 4.68; S, 10.20. Found: C, 60.43; H, 8.27; N, 4.78; S, 10.60.

EXAMPLE 9

This example further illustrates the very rapid reaction of the α-chloroalkyl alkyl sulfones relative to dialkyl sulfones, in the preparation of α-olefinic sulfonic acids.

α-Chlorobutyl butyl sulfide was prepared by chlorination of di-n-butyl sulfide with N-chlorosuccinimide in $CCl_4$. The product was then oxidized (perbenzoic acid in $CHCl_3$) to α-chlorobutyl butyl sulfone.

To a solution containing 1.97 g. of a 1.5:1 molar mixture of α-chlorobutyl butyl sulfone and di-n-butyl sulfone (i.e., 1.26 g. (0.006 mol) of the former, and 0.71 g. (0.004 mol) of the latter), in 20 ml. of t-BuOH and 20 ml. of $CCl_4$, was added 8.0 G. of powdered KOH, and the mixture was stirred for 5 minutes, initially at room temperature. During this period an obvious exothermic reaction was observed. The reaction mixture was diluted with 100 ml. of $CCl_4$ and immediately filtered.

The filtrate was washed three times with 50 ml. portions of water, dried ($MgSO_4$) and evaporated leaving 0.89 g. of yellow oil that solidified only when chilled. The mmr spectrum of the oil established its composition as di-n-butyl sulfone, α,α-di-chlorobutyl butyl sulfone, and α-chlorobutyl butyl sulfone in a molar ratio of 8:2:1. Thus, 0.61 g. (90 percent) of di-butyl sulfone was recovered; just 0.08 g. (6.3%) of α-chlorobutyl butyl sulfone was recovered; and only 0.20 g. (13% yield) of the α,α-dichlorobutyl butyl sulfone, produced from the monochlorosulfone, was present.

The solid residue from the original filtration was combined with the water washings of the filtrate, and the mass was concentrated in vacuo to dryness. The residual solids (containing KCl, KOH, and the α-olefinic sulfonic acid salt) was washed several times with hot t-BuOH, and the combined washings were concentrated to dryness leaving a tan solid, about 1.10 g., after being dried in the vacuum oven. This solid, identified by infrared (Nujol) and nmr ($D_2O$) spectra as potassium cis 4-octene-4-sulfonate, was identical to the potassium sulfonate prepared in Example 8.

EXAMPLE 10

Di-n-octyl sulfide was prepared from the reaction of sodium bisulfide with 1-bromooctane in 95 percent ethanol. Oxidation of the sulfide with hydrogen peroxide in acetic acid (steam bath, 1.5 hours) provided di-n-octyl sulfone, 90% yield (overall), m.p. 77°–79°C.

A vigorously stirred mixture of 10.0 g. of di-n-octyl sulfone, 40 g. of powdered potassium hydroxide, 40 ml. of carbon tetrachloride and 40 ml. of tertiary butyl alcohol was refluxed on the steam bath for 2 hours, after which two ml. of water was added and reflux continued for an additional 2 hours. The mixture was then filtered and the solid residue washed several times with hot tertiary butyl alcohol. The filtrate and washings were combined and concentrated under vacuum to dryness, providing a gummy solid residue. The residue was taken into a minimum of water and this mixture was continuously extracted (Soxhlet) with ether for four hours. About 3 g. of unreacted dioctyl sulfone was recovered by stripping off the solvent from the ether extract. The aqueous layer was evaporated to dryness under vacuum and the resulting solid residue was taken up in hot hexane, the solution dried ($MgSO_4$) and the solvent evaporated leaving a yellow waxy solid (dried overnight in vacuo). This material (7.5 g.) was characterized by infrared (Nujol) and nmr ($D_2O$) spectra as the potassium salt of 8-hexadecene-8-sulfonic acid. An aqueous solution of this material was turbid, had a pH of 7.2–7.4, and produced a thick foam when shaken.

Yields greater than 70 percent were obtained when the sulfone, carbon tetrachloride, and potassium hydroxide were heated (80°) for 10–12 hr., and no starting sulfone was recovered.

A concentrated aqueous solution of the product of this example was treated with an equivalent of p-toluidine hydrochloride to produce a yellow oil that separated out slowly. Crystallization could not be accomplished when this oil was treated with n-hexane, ethanol, or water. However, the IR spectrum (neat) and nmr spectrum ($DMSO_{d6}$) of this oil were characteristic of the p-toluidine salts of the other α-olefinic sulfonic acids, and the oil was definitively characterized (nmr) as the p-toluidine salt of 8-hexadecene-8-sulfonic acid.

EXAMPLE 11

Benzyl ethyl sulfone was prepared as follows: A mixture of 10.0 g. (0.080 mol) of benzyl chloride, 7.20 g. (0.10 mol.) of ethanethiol, 21 g. (0.20 mol.) of anhydrous $K_2CO_3$, and 150 ml. of anhydrous acetone in a flask fitted with a condenser, was stirred on a steam bath for 12 hrs. The mixture was filtered and the filtrate was concentrated to an oil, which was taken into ether. The ether solution was washed several times with dilute NaOH, then with saturated aqueous NaCl solution, dried over $MgSO_4$, and concentrated to an oil, 9.73 g (0.064 mol), 80 percent yield, of benzyl ethyl sulfide was obtained.

To the product oil, dissolved in 50 ml, of glacial acetic acid and cooled in an ice bath, was added 26 ml. of 30% $H_2O_2$ (0.26 mol. of $H_2O_2$) in portions, and the mixture was then refluxed for 2 hrs. The solution was concentrated, diluted with 100 ml. of $H_2O$, neutralized by the addition of solid $NaHCO_3$, and extracted with ether. The extract was dried ($MgSO_4$) and the solvent evaporated leaving a crystalline solid, which was recrystallized from ligroin-benzene to provide 8.9 g. (0.049 mol.), 77 percent yield (based on the sulfide) of white, crystalline benzyl ethyl sulfone, mp 83–84° (Lit. mp 84°).

To a vigorously stirred solution of 3.11 g. (0.017 mol.) of benzyl ethyl sulfone, 30 ml of $CCl_4$, and 30 ml. of t-butyl alcohol, cooled in an ice bath, was added 12 g. of powdered KOH. The mixture was agitated for a total of 3 hrs., for most of this time at 0°–5°. The solvents were evaporated in vacuo, 150 ml. of $H_2O$ was added to the resulting mass and the mixture was neutralized to pH 7 by the slow addition of HCl. This mixture was extracted three times with 50 ml. portions of ether.

The combined ether extracts were washed with $H_2O$, dried ($MgSO_4$), and concentrated in vacuo leaving as a residue 1.40 g. of a light brown oil whose IR and nmr spectra showed that it contained no sulfones, but did contain a mixture of isomeric 1-phenylpropenes and 1-chloro-1-phenylpropenes.

The aqueous layer and aqueous washings of the ether extracts were combined and concentrated to a solid mass in vacuo. After being dried overnight in the vacuum oven (25°C.) this solid mass was continuously extracted (Soxhlet) with absolute ethanol for 6 hrs. The ethanolic extract was dried over molecular sieves (No. 3A) and the solvent evaporated in vacuo leaving 1.11 g. (0.0047 mol.) 28% yield, of potassium cis-1-phenylpropene-2-sulfonate.

Product identity was confirmed by IR (Nujol) and nmr ($D_2O$) analyses.

To a stirred aqueous solution of 0.3 g. of potassium cis-1-phenylpropene-1-sulfonate in 5 ml. of $H_2O$ was added 0.4 g. of p-toluidine hydrochloride. Within 10 minutes a pale-yellow solid separated which was collected by filtration and recrystallized from a small amount of water. After three recrystallizations the almost-white crystalline mass had a constant mp of 187.5°–188.5°C. (cor) and was characterized as p-toluidiniumcis-1-phenylpropene-2-sulfonate.

Anal. Calc'd. for $C_{16}H_{19}NO_3S$: C, 62.93; H, 6.27; N, 4.59; S, 10.50.

Found: C, 63.02; H, 6.12; N, 4.32; S, 10.66.

EXAMPLE 12

Solid potassium 2-butene-2-sulfonate (0.5 g.) was suspended in 15 ml. of chloroform and the mixture was vigorously agitated at room temperature while powdered phosphorous pentachloride (1 g.) was added in portions. The temperature of the mixture rose slightly (25° to 40°C.) during the 1 to 2 hours of stirring. The pasty mixture was filtered and 20 ml. of saturated aqueous sodium bicarbonate was added, with stirring. The chloroform layer was separated, dried over magnesium sulfate, filtered and evaporated in vacuo leaving a pungent pale-yellow oil, 0.47 g. (100 percent yield), characterized by infrared (in $CS_2$) and nmr ($CCl_4$; and $C_6D_6$) as cis-2-butene-2-sulfonyl chloride.

EXAMPLE 13

Solid potassium 3-hexene-3-sulfonate (3.0 g.) was suspended in 30 ml. of chloroform and the mixture was vigorously agitated at 15°–20° while 6.0 g. of powdered phosphorous pentachloride was added in portions. The temperature of the mixture rose slightly (25° to 30°C.) during the two hours of stirring. The mixture was washed twice with 20 ml. portions of saturated aqueous sodium bicarbonate, then with water. The washed chloroform solution was dried over magnesium sulfate, filtered and evaporated in vacuo leaving a pungent pale-yellow oil, 2.60 g. (95 percent yield), characterized by infrared (in $CS_2$ and neat) and nmr ($CCl_4$; and $C_6D_6$) as cis 3-hexene-3-sulfonyl chloride. On distillation (bp 65°–67°/0.8mm) a colorless liquid was obtained.

EXAMPLE 14

Solid potassium 4-octene-4-sulfonate (3.0 g.) was suspended in 30 ml. of chloroform and the mixture was vigorously agitated at 15°–20° while 6.0 g. of powdered phosphorous pentachloride was added in portions. The temperature of the mixture rose slightly (25° to 30°C.) during two hours of stirring. The mixture was washed twice with 20 ml. portions of saturated aqueous sodium bicarbonate, then with water. The washed chloroform solution was dried over magnesium sulfate, filtered and evaporated in vacuo leaving a pungent pale-yellow oil, 2.72 g. (95% yield), characterized by infrared (in $CS_2$) and nmr ($CCl_4$; and $C_6D_6$) as cis 4-octene-4-sulfonyl chloride. On distillation (bp 73°–75°/0.4 mm) a colorless liquid was obtained.

Elemental analysis: Calculated for $C_8H_{15}ClO_2S$: C, 45.60; H, 7.16; Cl, 16.81; S, 15.22. Found: C, 45.79; H, 7.16; Cl, 16.83; S, 14.89.

EXAMPLE 15

Solid potassium 8-hexadecene-8-sulfonate (2.0 g.) was suspended in 20 ml. of chloroform and the mixture stirred vigorously while cooled to 15°–20°. Powdered phosphorous pentachloride (4.0 g.) was added in portions and the mixture was allowed to stir at room temperature for 2 hours. The resulting mixture was washed three times with 15 ml. portions of water, and the chloroform solution was dried (anhydrous $MgSO_4$) and evaporated in vacuo leaving 1.40 g. (70 percent yield) of a tan oil. Distillation (bp 70°–75°/0.2 mm) provided a colorless oil, characterized by IR (neat) and nmr ($CCl_4$; $C_6D_6$) as cis 8-hexadecene-8-sulfonyl chloride.

EXAMPLE 16

A small amount of the potassium salt of 8-hexadecene-8-sulfonic acid produced in Example 10 was dissolved in water. When the resulting solution was agitated, voluminous foaming was observed.

A drop of lubricating oil was suspended in a test tube of water and the potassium 8-hexadecene-8-sulfonate solution was added thereto. Complete dispersion of the drop of lubricating oil in the aqueous medium was observed.

Oily dirt from a vacuum pump was smeared on a glass slide. When water was rubbed on the smear, further smearing occurred. A few drops of the aqueous solution of potassium 8-hexadecene-8-sulfonate were then rubbed on the smear, cleanly removing it.

What is claimed is:

1. A process for preparing $\alpha,\beta$-unsaturated sulfonic acid derivatives which comprises the steps of:
   reacting a substrate selected from the group consisting of di-primary alkyl sulfonates, phenylmethyl primary alkyl sulfones, $\alpha$-halo di-primary alkyl sulfones and $\alpha$-halo phenylmethyl primary alkyl sulfones, in each of which the alkyl groups contain up to 20 carbon atoms, with a carbon tetrahalide represented by the formula $CBr_mCl_nF_p$ where m and n are integers between 0 and 4 inclusive, p is an integer between 0 and 2 inclusive, and m+n+p = 4 in the presence of a strong base selected from the group consisting of alkali metal hydroxides and alkali metal alkoxides at a temperature between about −15°C. and about 250°C. to form a di-$\alpha$-halogenated intermediate wherein the halogen is selected from the group consisting of chlorine and bromine, and a dihalocarbene; and reacting the di-$\alpha$-halogenated intermediate in situ with said strong base to form a salt of an $\alpha,\beta$-unsaturated sulfonic acid and a halide salt.

2. A process as set forth in claim 1 wherein the substrate is a di-primary alkyl sulfone corresponding to the structural formula:

$$R_1\text{-}CH_2\text{-}SO_2\text{-}CH_2\text{-}R_2$$

where $R_1$ and $R_2$ are alkyl and the product comprises compounds corresponding to the formulae:

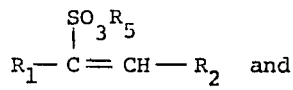

and

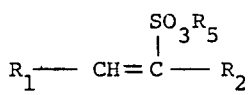

where $R_5$ in an alkali metal.

3. A process as set forth in claim 1 wherein the substrate is a phenylmethyl primary alkyl sulfone corresponding to the structural formula:

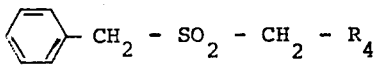

where $R_4$ is alkyl and the product comprises a compound corresponding to the formula:

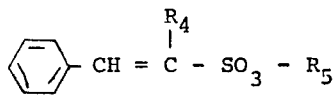

where $R_5$ is an alkali metal.

4. A process as set forth in claim 1 wherein the substrate is an α-halo di-primary alkyl sulfone corresponding to the structural formula:

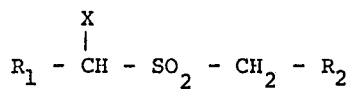

where X is halogen and $R_1$ and $R_2$ are alkyl and the product comprises compounds corresponding to the formulae:

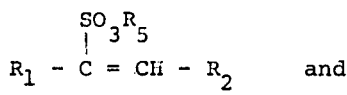

and

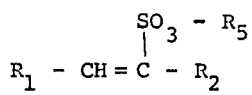

where $R_5$ is an alkali metal.

5. A process as set forth in claim 1 wherein a solvent for the substrate is also present.

6. A process as set forth in claim 5 wherein said solvent is t-butyl alcohol.

7. A process as set forth in claim 6 wherein said base is powdered potassium hydroxide containing a minor proportion of water.

8. A process as set forth in claim 7 wherein said carbon tetrahalide is carbon tetrachloride.

* * * * *

UNITED STATES PATENT OFFICE
CERTIFICATE OF CORRECTION

PATENT NO. : 3,876,689

DATED : April 8, 1975

INVENTOR(S) : Cal Y. Meyers and Laurence L. Ho

It is certified that error appears in the above-identified patent and that said Letters Patent are hereby corrected as shown below:

Column 12, line 31, "(in $D_3O$)" should read -- (in $D_2O$) --. Column 15, line 54, "4-octene-4-sulfonate" should read -- 8-octene-8-sulfonate --. Column 18, line 51, "alkyl sulfonates" should read -- alkyl sulfones --.

Signed and Sealed this twenty-second Day of July 1975

[SEAL]

Attest:

RUTH C. MASON
Attesting Officer

C. MARSHALL DANN
Commissioner of Patents and Trademarks